3,822,224
PROCESS OF PREPARING VESICULATED CROSS-LINKED POLYESTER RESIN GRANULES
John Gillan, Nobel Park, Victoria, and Robert William Kershaw, South Blackburn, Victoria, Australia, assignors to Balm Paints Limited, Melbourne, Victoria, Australia
No Drawing. Continuation of abandoned application Ser. No. 98,169, Dec. 14, 1970. This application Aug. 22, 1972, Ser. No. 282,656
Claims priority, application Australia, Dec. 22, 1969, 65,645/69
Int. Cl. C08g 53/08
U.S. Cl. 260—2.5 N        8 Claims

ABSTRACT OF THE DISCLOSURE

A process of preparing vesiculated cross-linked polyester resin granules in which a solution in an essentially water-insoluble polymerisable unsaturated monomer of an unsaturated carboxylated polyester resin is suspended as discrete globules in an aqueous continuous phase in the presence of from 0.3 to 10.0 equivalents per carboxyl group of a base having a dissociation exponent of less than 8 and polymerisation initiated to cross-link the polyester resin, the process being further characterised in that the said unsaturated polyester resin must be soluble in xylene in the weight proportion in which it is to be used in the process as a solution in the unsaturated monomer and when 5% by weight of an aqueous ammonia solution the ammonia content of which is one molar equivalent based on the acid value of the resin is stirred into the said xylene solution of polyester resin there is formed spontaneously therein a dispersion of aqueous liquid droplets essentially of less than 5 micron diameter which dispersion remains stable for at least 30 minutes.

---

This is a continuation of prior United States Application Ser. No. 98,169 filed Dec. 14, 1970, now abandoned.

This invention relates to a process of preparing vesiculated polymer granules and to vesiculated granules so-produced.

By vesiculated polymer granules we mean granules of polymer which comprise a plurality of cells or vesicles. Ideally, each vesicle is encased in a completed shell of polymer, i.e. the polymer granule does not have a continuous porosity extending from one cell to another, but consists of a plurality of discrete isolated vesicles. There may be a minor proportion of imperfect vesicles in which some of the polymer shell has either not formed or has been broken away allowing entry from one vesicle to its neighbour.

We have now found that it is possible to prepare vesiculated polymer granules of pre-determined size, the granules containing vesicles of unusually uniform and small diameter, from certain unsaturated polyester resins which are cross-linkable by an addition polymerisation reaction with unsaturated monomer, by the process described hereinunder. The granules so-formed are insoluble in many organic liquids and are particularly useful as opacifying of polymer films and surface coatings.

Carboxylated unsaturated polyester resins which will react with a polymerisable unsaturated monomer to give a cross-linked resin are well-known in the art, as are ways of initiating the polymerisation reaction. We have now observed that this reaction can be carried out in globules of a solution of an unsaturated polyester resin in a polymerisable monomer which are suspended in an aqueous liquid, to produce granules of cross-linked polyester resin. In addition, we have made the surprising discovery that if the polyester resin is selected by the test described hereinunder, cross-linked granules can be prepared in which a vesiculated structure is formed.

We now provide a process of preparing vesiculated cross-linked polyester resin granules in which a solution of a carboxylated unsaturated polyester resin selected as hereinunder defined in an essentially water-insoluble polymerisable unsaturated monomer is suspended as discrete globules in an aqueous continuous phase in the presence of from 0.3 to 10 equivalents per carboxyl group of a base having a dissociation exponent of less than 8 and polymerisation initiated to cross-link the polyester resin.

By an essentially water-insoluble monomer we mean monomer which has a solubility in water at 25° C. of the order of styrene and "vinyl toluene."

The vesicles are formed within the granules by entrapped droplets of aqeous liquid which form spontaneously within the dispersed polyester resin solution. Optionally, especially when granules of high vesicle volume are required, droplets of an aqueous liquid may be pre-dispersed within the polyester resin solution before this solution itself is dispersed in the continuous phase to augment the vesicles which form spontaneously. Essentially gaseous vesicles are formed when the trapped liquid is expelled from the granules by, for example, allowing them to dry in air until the liquid has diffused out of them.

The unsaturated polyester resin to be used in this invention is selected from condensation polymers which provide both polymerisable unsaturated for co-reaction with the unsaturated monomer and carboxyl groups which react with and are at least partially neutralised by the added base. The polyester resin and polymerisable monomer are chosen in the first instance in known manner, bearing in mind the degree of hardness required in the cross-linked granules. In general, the cross-linked resin should be a hard solid at ambient temperature. Unsaturated polyesters of this general type are well known, but we require additionally that the polyester for use in the process of this invention be selected by the following screening test. The resin must first be soluble in xylene. If necessary the mixture may be warmed to facilitate the preparation of a tractable solution. To a solution in xylene of the polyester under test is added, with mild agitation, 5% by weight of an aqueous solution of ammonia. The amount of ammonia is one molar equivalent based on the acid value of the resin and the total solids of the polyester solution in xylene is equal to that of the resin solution in monomer to be used to prepare the granules. The mixture is then examined under an optical microscope. If the resin is suitable for the preparation of cross-linked vesiculated granules according to our process, a stable dispersion of droplets of aqueous liquid will be seen to have formed in the resin solution. The droplets are frequently of sub-micron size, but provided the mixture is essentially free of disperse particles greater than 5 micron and remains so for up to 30 minutes the resin is regarded as satisfactory for our purpose. The presence of an occasional isolated larger droplet is not significant. If an unstable dispersion is formed or the disperse particles have diameters appreciably greater than 5 micron, the unsaturated polyester resin is rejected as unsatisfactory. In practice, we have observed that when polyester resins are so-tested they fall clearly into either one or other of the two categories and are readily differentiated in this way. The preferred resins for the preparation of granules with very small vesicles are those resins which are seen to contain substantially sub-micron disperse particles when tested as above.

We have not found any clear relationship between or corresponding limitation on the composition of the polyester resin and the results of this screening test, but in general we have observed that the resin should have a viscosity (as a 70% by weight solution in xylene) of at least Gardner-Holdt E and an acid value of 5–75 mgm. KOH per gm. Preferably the viscosity should be greater than Gardner-Holdt S and the acid value 10–50 mgm. KOH per gm.

The polyester resins from which a selection is made are condensation products of polybasic acids (or the corresponding anhydrides) and dihydric alcohols. Polymerisable unsaturation may be introduced into the molecule by the selection of an $\alpha,\beta$-ethylenically unsaturated acid, optionally in combination with a saturated acid or anhydride.

Thus suitable acids are, for example: unsaturated aliphatic acids, e.g. maleic, fumaric, itaconic, citraconic and mesaconic acids; saturated aliphatic acids, e.g. malonic, succinic, glutaric, adipic, pimelic, azelaic and sebacic acids; and
saturated aromatic acids, e.g. phthalic, isophthalic, terephthalic, tetrachlorophthalic, tetrahydrophthalic, trimellitic, trimesic and chlorendic acids.

Suitable dehydric alcohols are chosen from, for example, ethylene glycol, poly(ethylene glycols) e.g. diethylene glycol, hexane-1,6-diol, propylene glycol, di-cyclohexanol and neopentyl glycol. Alternatively, the alcohol may be one which initially contained three or more hydroxyl groups, the groups in excess of two optionally being at least in part etherified with, for example, a monohydric alcohol e.g. methanol, ethanol and n-butanol or esterified with a monobasic acid, e.g. benzoic acid, p-tert-butyl benzoic acid and saturated and unsaturated aliphatic acids of up to 18 carbon atoms chain length. Alternatively the dihydric alcohol may be used in the form of an alkylene oxide, e.g. ethylene oxide and propylene oxide.

The methods by which unsaturated polyesters of this type are formulated and made are well known in the art.

Optionally the polyester resin solution may be pigmented in a conventional manner to obtain special physical effects, e.g. to increase the inherent opacifying effect of the granules or to obtain special colour effects. The pigmentation chosen must be water-insoluble and the addition of materials known to prevent free radical polymerisation avoided. As described below, pigment may also be introduced into the vesicles.

As mentioned above, the unsaturated monomer with which the unsaturated polyester resin is dissolved and cross-linked must be essentially water-insoluble. A single monomer or a mixture of monomers may be used for this purpose and in general the monomer will contain only a single polymerisable double bond. However, it is known that polyfunctional monomers, that is monomers containing more than one polymerisable double bond, are also useful to cross-link unsaturated polyester resins. Such polyfunctional monomers are, however, normally used only as a minor constituent of a mixture of monomers, the major proportion of which is monofunctional monomer. Monomer mixtures such as these may be used in the performance of our invention.

The preferred monomers for use in our process are selected from styrene, $\alpha$-methyl styrene, "vinyl toluene" and divinyl benzene.

The performance of the invention is not restricted to the above monomers alone, however. Bearing in mind the requirement that the total monomer must be essentially insoluble in water and also be a solvent for the unsaturated polyester resin, there may be present in a minor proportion other polymerisable unsaturated monomers to, for example, modify the physical properties of the co-reacted resins. Typical co-monomers are, for example, esters of acrylic and methacrylic acids, e.g. methyl(meth)acrylate, ethyl(meth)acrylate, n-butyl(meth)acrylate, acrylonitrile, vinyl acetate, tetra-allyl ethoxy ethane, ethylene glycol dimethacrylate and triallyl cyanurate.

Optionally a few percent by weight of a non-polymerising organic liquid, e.g. n-butanol, may be mixed with the monomer to increase the solubility of the polyester resin therein.

The aqueous continuous phase is primarily water, but it is common practice in preparing aqueous dispersions or suspensions to add to the continuous phase surface active agents and optionally polymeric thickeners to stabilise the system. Accordingly, in the process of the present invention we frequently use in the aqueous continuous phase a surface-active agent which may be selected from those materials known in the art to stabilise oil-in-water type suspensions. For example, the surface-active agent may be of the well-known class in which a poly(alkylene oxide) chain is attached to an alkyl phenol, e.g. nonyl phenol, group. Alternatively there may be used a water-soluble partially hydrolysed poly(vinyl acetate), typically of molecular weight 100,000.

If insufficient surface active agent is used the suspension formed may be unstable, while if an excess is used complete emulsification of the components with loss of the discrete globules of polyester resin solution may take place. As a general guide we have found that a concentration by weight of 0.01–0.5% by weight of the poly(vinyl acetate) types of surface active agents in the aqueous continuous phase usually give satisfactory results.

We have also found it desirable to include in the aqueous continuous phase a soluble polymeric material to increase its viscosity. An increase in viscosity of the aqueous continuous phase inhibits settling of the suspended globules and favours the formation of smaller gloubles of polyester resin solution. Suitable thickeners are, for example, water-soluble ethers of cellulose, especially hydroxy ethyl cellulose. They are typically used at concentrations of 0.02–1.0% by weight of the aqueous liquid.

The base used in the performance of the invention must be a strong base, by which we mean a base which is capable of at least partially ionising the carboxyl groups of the unsaturated polyester resin; to give a stable aqueous dispersion of polyester. In general, such a base will have a dissociation exponent of less than 8, preferably less than 5. By a dissociation exponent we mean $-\log_{10}K_b$ where $K_b$ is the dissociation constant of the base in water at 25° C. Suitable strong bases are, for examples;

inorganic bases, e.g. sodium, potassium, lithium and ammonium hydroxides and their corresponding carbonates;
water-dispersible aliphatic amines, for example:
primary amines, e.g. methylamine, ethylamine, n-propylamine, iso-propylamine, n-butylamtine and iso-butylamine;
secondary amines, e.g. dimethylamine, diethylamine, di-n-propylamine, di-iso-propylamine di-n-butylamine and di-iso-propylamine;
tertiary amines, e.g. trimethylamine, triethylamine, methyl diethylamine, ethyl dimethylamine, n-tripropylamine and iso-tripropylamine;
hydroxyamines, e.g. ethanolamine, diethanolamine and N-methyl ethanolamine;
cyclic amines, e.g. morpholine, pyrrolidine and piperidine; and
polyamines, e.g. ethylene diamine, diethylenetriamine, triethylene tetramine, n-propylene diamine, n-hexylene diamine and methane diamine.

Mixtures of the above bases may also be used.

The most broadly useful base is ammonium hydroxide. We have found, however, that when granules of the order of 5 micron or less and comprising submicron vesicles are being prepared, the best results are frequently given by the selection of an alkali metal carbonate as at least a major proportion of the neutralising base. When larger granules are being prepared but very fine vesicles are required we prefer to use a base comprising at least 10% by weight of a polyamine of the above type. A minor proportion of non-preferred bases can be tolerated in combination with the preferred bases.

The amount of base required to form stable dispersions of the unsaturated polyester resin solution in the aqueous continuous phase is related to the free carboxyl groups of the resin. The minimum amount of base to be used is 0.3 equivalents of base per caboxyl group and for the best results 0.7 equivalents of base per carboxyl group. At concentrations of base approaching 10 equivalents per carboxyl group the dispersion of globules in the aqueous continuous phase tends to become unstable, and in general we have found that a maximum concentration of 3 equivalents of base per carboxyl group is a desirable upper limit.

The granules may be prepared by first suspending a solution of the selected polyester resin in the monomer (typically 40 to 80% by weight of resin) in the aqueous continuous phase and in the presence of the base, with continuous mechanical agitation. Droplets of aqueous liquid form spontaneously within the suspended globules and subsequently provide the vesicles in the cross-linked polyester granules. The size of the suspended liquid globules formed controls the size of the final vesiculated granules and is regulated by the following factors. Smaller globules are favoured by high stirring rates and increased viscosity of the aqueous liquid. Increasing the viscosity of the polyester resin solution usually produces coarser globules. The size of the discrete droplets which provide the vesicles is influenced to some extent by the choice of base and unsaturated polyester resin and by the concentration within the aqueous continuous phase of any dissolved material, presumably due to osmotic effects. In practice, if the discrete droplets which form within the globules are not of the required size, the composition of the base is varied along the lines indicated above to achieve a more satisfactory droplet size. Alternatively, it may also be necessary to vary the composition of the resin, e.g. by adjusting its viscosity or acid value to produce the desired droplet size. The base, optionally dissolved in water, may be pre-mixed with the polyester solution or added to the aqueous continuous phase itself before or after the addition of the polyester resin solution.

A preferred method which is particularly useful for the preparation of granules of high vesicle volume or where some pigment is to be incorporated into the vesicles, is to disperse droplets of a solution of the selected base in water, optionally pigmented, into the unsaturated polyester solution and then suspend this product, which mechanical agitation, in the aqueous continuous phase. In this way there is formed a suspension of globules of polyester resin solution in the aqueous liquid and within each such globule a dispersion of droplets of aqueous liquid.

Polymerisation is initiated within the globules by a free radical initiator, e.g. an organic peroxide or bis-azo nitrile or by exposure to a radiation source such as radioactive cobalt or ultra-violet radiation. When an organic source of free radicals is used this is conveniently introduced into the reactants by dissolving it in the monomer or polyester solution before the globules suspension is prepared. The vesiculated granules so-formed may be mechanically separated from the aqueous continuous phase and dried or they may be incorporated as an aqueous slurry directly into suitable aqueous compositions. In either case, loss of water from the granules ultimately provides essentially air-filled vesicles; in which form they exert their maximum opacifying effect.

By the process of this invention vesiculated granules of from 0.1 to 500 micron diameter may be prepared and with vesicle diameters ranging from 0.01 to 5.0 micron. The maximum achievable diameter of granules is not limited to 500 micron, however, and for special purposes granules of up to 2–3 mm. diameter can be prepared by control of the initial globule size. Each granule will, on average, contain more than one vesicle and when the granules are intended for use as opacifying agents the vesicles, which may occupy from 5 to 75%, preferably 10 to 50%, by volume of the granule, should have diameters within the range of 0.15 to 5.0 micron, preferably 0.03 to 1.0 micron.

The vesiculated polymer granules of this invention may be used as low-density fillers and opacifiers in plastics mouldings, polymer films and paper. For these purposes we prefer to use the granules in proportions of up to 25% by volume in the compositions. When so-used as fillers the vesiculated granules preferably have a diameter of 50 micron maximum, their opacifying effect being greatest at diameters of up to 5 micron.

Large retiporous granules are particularly useful as components of plastics mouldings used in particular as building sheeting and construction members. For this purpose we usually prefer to use large granules of the order of 2–3 mm. diameter and of vesicle contents up to about 80% by volume of the granules. When embedded in moulded plastic articles of this type, air-filled granules of these dimensions confer exceptional lightness on the articles. This is due in part to the opportunity inherent in our process to pre-select the size distribution of the granules to obtain optimum packing within the plastic matrix in which they are embedded. By contrast with foamed plastics articles which are prepared by an *in situ* foaming process, the use of these granules enables pore-containing articles to be prepared with a pre-determined concentration and size of voids and hence unusual uniformity of structure.

Furthermore, they are particularly useful as matte texturizing, flatting and opacifying agents in paint compositions. Granules having a mean diameter of 50 to 500 micron or more can be used to obtain texturing effects in paint films while, in general, if the mean particle diameters of the granules lie within the range of 1 to 100 micron the texturing effect is less pronounced and the granules can be used to obtain an opacifying and matting effect in matte and semi-matte paints. For the best results in matte paints, especially matte aqueous latex paints, we prefer that the granules should be essentially of from 1 to 50 micron diameter and with a volume average diameter of from 5 to 35 micron. The volume average diameter is defined by the expression $$\Sigma V^1 d^1$$

where $V^1$ is the volume fraction of all particles of diameter $d^1$.

Matte paints comprising granules of lower volume average diameter than 5 micron tend to exhibit glossiness in the applied paint film and if the volume average diameter exceeds 50 micron the surface appearance of the film is marred by coarse particles which disrupt the otherwise uniform matte surface. The diameter will, of course depend on the average diameter of the vesiculated granule but we have found Granules with a diameter within the range 0.1 to 5 micron are particularly useful in gloss and semi-gloss paints. By reason of their vesiculated structure such granules impart opacity to paint films in which they are embedded. In contrast to the use of conventional opacifying pigments, this opacity is gained without significantly increasing the density of the film which, for some applications in particular, e.g. paper coatings, can be an important advantage. The maximum acceptable vesicle diameter will, of course depend on the average diameter of the vesiculated granule but we have found that the opacifying effect is related to the diameter of the individual vesicles, the optimum light scattering effect of vehicles containing air being achieved in the range of about 0.2 to 0.5 micron diameter.

It is an important feature of this embodiment of our invention that when the vesiculated polymer granules are suitably sized they can be used to opacify a glossy paint film without detracting from its surface gloss; typically at granule diameters of less than 1 micron. On the other hand, by the choice of somewhat coarser granules both the opacity and surface gloss of compositions can be controlled in a predictable manner; the coarser the granules the lower the achievable gloss.

Furthermore, because the granules and the paint film-forming polymer may have different physical characteristics, the granules can be used to regulate the overall mechanical properties of a film in which they are incorporated. For example, the use of the relatively hard cross-linked vesiculated granules prepared according to the invention can be used to increase the hardness and abrasion resistance of a film.

The paints may be prepared by stirring vesiculated granules into a conventional paint formulation comprising film-forming polymer and optionally pigment, typically to a maximum granule volume concentration based on the total solids of the paint of 55% in gloss and semi-gloss paints, while for matte paints the granule volume concentration may be as high as 95%.

The invention is illustrated by the following examples, in which all parts are expressed by weight.

EXAMPLE 1

Preparation of vesiculated polymer granules from unsaturated polyester resin selected as hereinabove described.

An unsaturated polyester resin was prepared by conventional means from fumaric acid, phthalic anhydride and propylene glycol in the molar proportions of 3:1:4. The product had an acid value of 44 mgm. KOH per gm. and a Gardner-Holdt viscosity of T as a 70% by weight solution in xylene. The suitability of the resin for the preparation of vesiculated granules was confirmed by adding 5% by weight of water containing ammonia to a stirred portion of a 60% solution of the resin in xylene, the ammonia being present in a molar equivalent amount calculated on the free carboxyl groups of the resin. A stable "water-in-oil" dispersion formed, the disperse droplets of aqueous liquid being essentially of less than 5 micron diameter.

A solution of 18.0 parts of the unsaturated polyester resin and 0.5 parts of benzoyl peroxide in 12.0 parts of styrene was added with high speed stirring to an aqueous liquid consisting of 4.06 parts of hydroxy ethyl cellulose, 7.28 parts of poly(vinyl alcohol) of molecular weight about 110,000 and 20% residual vinyl acetate units, 719.0 parts of water and 2.0 parts of diethylene triamine. A suspension of globules of polyester resin solution of average diameter 15 micron formed, the globules containing numerous small disperse drops of aqueous liquid. The globules were polymerised by heating the suspension in a closed vessel at 95° C. for three hours. The suspension of granules so-obtained was diluted with 4000.0 parts of water, allowed to stand for a day and the concentrated suspension of sedimented granules separated from the bulk of the water. The average granule diameter was 15 micron and it was estimated by microscopic examination that the granules comprised about 25% by volume of vesicles of less than 2 micron diameter. On allowing the granules to dry in air substantially air-filled vesicles were formed.

EXAMPLE 2

This example illustrates the effectiveness of the selection test in avoiding the use of unsatisfactory polyester resins for the performance of the invention.

Two unsaturated polyester resins were prepared from the reactants used in Example 1, one having an acid value of 25 mgm. KOH per gm. and Gardner-Holdt viscosity of X as a 70% by weight solution in xylene and the other having an acid value of 85 mgm. KOH per gm. and viscosity of K at the same percent solids.

When the selection test with aqueous ammonia as described in Example 1 was carried out on the two resins the first resin was seen to contain disperse droplets of substantially less than 5 micron in diameter while the second resin gave an unstable dispersion of much larger droplet diameter.

The two resins were converted into granules by the method described in Example 1, the first resin giving granules of 15 micron average diameter and comprising 10% by volume of viscles of less than 2 micron diameter. The second resin gave granules of about 5 micron average diameter but with no visicles formed therein. The unsuitability of the second resin for the performance of the invention was in agreement with the results of the selection test.

EXAMPLE 3

The effect of base concentration on the visicile content of granules is demonstrated.

Four portions each of 15.0 parts of an 80% by weight solution of the unsaturated polyester resin of Example 1 in styrene to which 0.5 parts of benzoyl peroxide had been added, were separately dispersed in the following aqueous liquids and polymerised by the general method of Example 1:

| | Parts |
|---|---|
| Poly(vinyl alcohol) as Example 1 | 7.28 |
| Hydroxy ethyl-cellulose | 4.16 |
| Water | 719.00 |
| Diethylene triamine | Refer table |

In each case the suspended resin solution globules polymerised to granules of average diameter 15 micron and comprised vesicles of about 2 micron diameter.

| Sample No. | Diethylene, parts | Approximate base concentration[1] | Approximate vesicle volume, percent |
|---|---|---|---|
| 1 | 0.1 | 0.3 | 5 |
| 2 | 0.2 | 0.7 | 10 |
| 3 | 0.3 | 1.0 | 30 |
| 4 | 0.5 | 1.7 | 30 |

[1] Expressed as a proportion of the stoichiometric amount.

The concentration of vesicles in the granules increased with increasing base concentration to a maximum in sample No. 3, but was unaffected by further base addition.

EXAMPLE 4

Preparation of vesiculated polymer granules using an inorganic base

An unsaturated polyester resin was prepared at an acid value of 38 mgm. KOH per gm. and Gardner-Holdt viscosity of W as a 70% by weight solution in styrene, from maleic anhydride, phthalic anhydride and propylene glycol in the molar ratios of 1:1:2. The resin when subjected to the above-described screening test formed disperse aqueous droplets of less than 5 micron diameter.

By the general method of Example 1 vesiculated granules were prepared from 30.0 parts of the above resin solution in styrene to which was added 3.0 parts of toluene and 0.5 parts of benzoyl peroxide, dispersed as droplets in an aqueous liquid consisting of:

| | Parts |
|---|---|
| Hydroxyl ethyl cellulose | 4.2 |
| Poly(vinyl alcohol) as Example 1 | 7.3 |
| Water | 720.0 |
| Sodium carbonate | 4.0 |

The granules were of from 1–3 micron diameter and comprised 20% by volume of vesicles of 0.05–0.5 micron diameter.

EXAMPLE 5

Preparation of vesiculated polymer granules using mixed bases

An unsaturated polyester resin was prepared at an acid value of 40 mgm. KOH per gm. and Gardner-Holdt viscosity of Z, as a 70% by weight solution in styrene, from fumaric acid, phthalic anhydride and propylene glycol in the molar ratios of 3:1:4. The resin when subjected to the above-described screening test formed disperse droplets of less than 5 micron diameter.

By the general method of Example 1 vesiculated granules were prepared from 53.5 parts of the above resin solution in styrene to which was added 21.5 parts of styrene and 1.0 part of benzoyl peroxide, dispersed as droplets in an aqueous liquid consisting of:

| | Parts |
|---|---|
| Hydroxyl ethyl cellulose | 0.34 |
| Poly(vinyl alcohol) as Example 1 | 1.30 |
| Water | 200.00 |
| 0.88 ammonia | 1.00 |
| Diethylene triamine | 0.50 |

The granules were of 5 micron average diameter and comprised 30% by volume of vesicles of 2 micron maximum diameter.

EXAMPLE 6

Preparation of vesiculated polymer granules using a mixture of polymerisable monomers for co-reaction with the unsaturated polyester resin An unsaturated polyester resin was prepared at an acid value of 38 mgm. KOH gm. and Gardner-Holdt viscosity of W as a 70% by weight solution in styrene, from maleic anhydride, phthalic anhydride and propylene glycol in the molar ratios of 1:1:2. The resin when subjected to the above-described screening test formed disperse droplets of essentially less than 5 micron diameter.

By the general method of Example 1 vesiculated granules were prepared from 37.4 parts of the above resin dissolved in 33.0 parts of "vinyl toluene" and 4.5 parts of methyl methacrylate to which was added 2.0 parts of benzoyl peroxide, the solution then being dispersed as globules in an aqueous liquid consisting of:

| | Parts |
|---|---|
| Hydroxy ethyl cellulose | 0.7 |
| Poly(vinyl alcohol) as Example 1 | 2.6 |
| Water | 200.0 |
| Diethylene triamine | 1.7 |

A further 175.0 parts of water were added to the suspension before heating to 95° C. to polymerise the resin components.

The vesiculated granules were of 15 micron average diameter and comprised 30% by volume of vesicles of less than 2 micron diameter.

EXAMPLE 7

Preparation of aqueous latex paints containing vesiculated granules prepared according to the process of the invention A series of aqueous latex paints was prepared by the following general method, using vesiculated granules as identified hereinunder.

A mixture of 12.1 parts of pigment grade rutile titanium dioxide and 0.06 parts of sodium hexamethphosphate was added to 80.0 parts of an aqueous slurry of vesiculated polymer granules containing 14.0% by weight of granules and stirred with a high-speed mechanical disc agitator for 30 minutes. The stirring speed was then lowered to reduce aeration of the mixture and 17.2 parts of a 46.5% by weight commercial acrylic copolymer aqueous latex added. The granules used in each of the paint samples so-prepared were as follows:

| Sample No. | Granules from— | Average diameter in micron |
|---|---|---|
| (a) | Example 1 | 15 |
| (b) | Example 3, Sample 1 | 15 |
| (c) | Example 3, Sample 2 | 15 |
| (d) | Example 3, Sample 3 | 15 |
| (e) | Example 3, Sample 4 | 15 |
| (f) | Example 4 | 2 |
| (g) | Example 5 | 2 |
| (h) | Example 6 | 15 |

Films of each paint were applied by brush to glass panels at a spreading rate of approximately 600 sq. ft. per gallon and allowed to dry in air at 25° C. and 50% relative humidity. All paints formed coherent, dry films in less than one hour. Paint (f) formed a glossy film and paint (g) a semi-gloss film. The other paints formed films of lower gloss levels; they were uniform, matt films. It was observed that the films from samples (b) and (c) were of lower opacity than the other films, which was consistent with the lower vesicle content of the granules contained therein. Their opacity was, however, higher than that of films formed from control paints having the same overall composition as the test paints but replacing the vesiculated polymer granules with non-vesiculated polymer granules of approximately the same diameters.

EXAMPLE 8

Preparation of non-aqueous paints comprising vesiculated polymer granules prepared by the process of the invention Two paint compositions were prepared by the following general method using granules prepared according to Examples 4 and 5 respectively.

Rutile titanium dioxide was dispersed to a pigment volume concentration (on solids) of 12% into a solution in a 1:1 mixture of toluene and acetone of a 98/2 methyl methacrylate/methacrylic acid copolymer solution (20.0 parts of 40% solution). Dry vesiculated polymer granules (5.0 parts), acetone (10.0 parts), toluene (10.0 parts) and n-butyl benzyl phthalate (5.0 parts) were added to the dispersion and the aggregates dispesred by stirring at highspeed with sand.

After removal of the sand, the compositions were sprayed onto Morest charts and after drying at room temperature for one hour the coated charts were baked at 150° C. for 30 minutes.

Each paint produced a uniform, satin film. The films were compared with the films of control paints prepared and tested in the same way, but replacing the vesiculated granules with an equal volume of granules of the same size and composition, but free of vesicles. In each case the films comprising vesiculated granules were of substantially higher opacity than the control films.

EXAMPLE 9

Preparation of a polymeric sheet containing vesiculated granules prepared according to the invention Polyethylene granules (98.0 parts) were blended with 2.0 parts of dry vesiculated polymer granules prepared according to Example 5. The dry blend was extruded in the form of a tube, fed through a granulator and then extruded in the form of a sheet of about 1 mm. thickness. The sheet was opaque whereas a sheet formed in the same way from the polyethylene granules but omitting the vesiculated polyester granules was transparent.

EXAMPLE 10

Preparation of vesiculated polyester resin granules in which the polyester resin is pigmented with titanium dioxide An unsaturated polyester resin was prepared by conventional means from fumaric acid, phthalic anhydride and propylene glycol in the molar proportions of approximately 3:1:4. The product had an acid value of 22.5 mgm. KOH per gm. and a Gardner-Holdt viscosity of $Z_2$ as a 70% solution in styrene. When tested by the screening test described in Example 1 disperse aqueous droplets of less than 5 micron diameter formed in the resin solution.

To 128 parts of a 40% by weight solution of the resin in styrene was added 32 parts of pigment grade rutile titanium dioxide and the mixture blended for 30 minutes with a high speed mechanical stirrer.

A mixture of 3 parts of cumene hydroperoxide and 1 part of a surface-active agent (octyl phenol/ethylene oxide co-condensate containing 5 ethylene oxide units per molecule) was stirred quickly into the above mixture, which was then immediately suspended in globular form in an aqueous continuous phase by the general method of Example 1, the continuous phase consisting of the following mixture:

| | Parts |
|---|---|
| Water | 480.00 |
| Hydroxy ethyl cellulose | 1.00 |
| 7.5% by wt. solution in water of poly(vinyl alcohol) as example 1 | 30.00 |
| 0.880 ammonia | 0.50 |
| Diethylene triamine | 0.57 |

Globules of resin solution of about 25 micron maximum diameter and containing disperse aqueous droplets formed in the continuous phase. A further 120 parts of water and 1.0 part of 0.880 ammonia were then added to the suspension. Cross-linking of the unsaturated polyester resin was accomplished by heating the above suspension to 95° C. and holding at this temperature for 1 hour.

The cross-linked granules were of about 25 micron maximum diameter and contained approximately 25% by volume of vesicles with a maximum diameter of 1 micron.

EXAMPLE 11

Preparation of vesiculated polyester resin granules in which the vesicles contain titanium dioxide pigment An aqueous pigment dispersion was prepared by sand grinding the following mixture:

| | Parts |
|---|---|
| Water | 32.00 |
| Diethylene triamine | 0.57 |
| 0.880 ammonia | 0.50 |
| Rutile titanium dioxide | 32.00 |

The above dispersion was added with vigorous mechanical stirring to 128.0 parts of a 40% by weight solution in styrene of the unsaturated polyester resin of example 10 in which it formed a water-in-oil type dispersion of aqueous droplets. To this mixture was then added 3.0 parts of cumene hydroperoxide and the entire mixture then added with stirring to an aqueous continuous phase, in which it formed a suspension of discrete globules, each of which contained within it disperse droplets of aqueous liquid. A further 318 parts of water and 1.0 part of 0.880 ammonia was then added.

The composition of the aqueous continuous phase was as follows:

| | Parts |
|---|---|
| Water | 450.0 |
| Hydroxyl ethyle cellulose | 1.0 |
| 7.5% by wt. solution in water of poly(vinyl alcohol) as in Example 1 | 30.0 |
| 0.880 ammonia | 0.1 |

The unsaturated polyester resin polymerised on standing at room temperature for 24 hours to give cross-linked vesiculated granules with diameters of up to 30 micron. A sample of the granules was filtered from the suspension and dried in air. A cross-section of the granules viewed under an electron microscope showed the presence of a vesiculated internal structure and the presence within the vesicles of pigment particles. The vesicle volume was estimated to be 30% of the total granule volume.

EXAMPLE 12

Preparation of vesiculated polyester resin granules comprising gaseous vesicles

An unsaturated polyester resin was prepared in a conventional manner from fumaric acid, phthalic anhydride and propylene glycol in the molar ratios of approximately 3:1:4. The product an acid value of 38 mgm. KOH per gm. and a Gardner-Holdt viscosity of $Z_2$ as a 70% by weight solution in styrene. The resin passed the above-described screening test.

To 32.0 parts of a 40% by weight solution in styrene of the above resin was added 0.2 parts of an octyl phenol/ethylene oxide surface active agent (as example 10) and 0.7 parts of cumne hydroperoxide.

The above mixture was added with stirring to an aqueous continuous phase, in which it formed discrete globules containing disperse aqueous droplets. The composition of the continuous phase was as follows:

| | Parts |
|---|---|
| Water | 90.00 |
| Hydroxy ethyl cellulose | 0.10 |
| 0.880 ammonia | 0.36 |
| Diethylene triamine | 0.12 |

A further 130 parts of water were then added.

The suspended globules of unsaturated polyester resin solution were cross-linked by holding the suspension at 90° C. for 2 hours. The suspension of cross-linked vesiculated granules was then dried by passing through a standard spray-drier, to give dry (less than 2% by weight moisture) vesiculated granules of 10 micron maximum diameter.

EXAMPLE 13

Effect of polyamines on the vesicle size of cross-linked polyester resin granules An aqueous continuous phase was prepared by mixing:

| | Parts |
|---|---|
| Water | 180.0 |
| Hydroxy ethyl cellulose | 0.3 |
| Poly(vinyl alcohol) as example 1 | 1.0 |
| 0.880 ammonia | 1.0 |
| Diethylene triamine | 0.5 |

An unsaturated polyester resin was prepared in conventional manner from fumaric acid, phthalic anhydride and propylene glycol in the approximate molar ratios of 3:1:4. The product had an acid value of 40 mgm. KOH per gm. and a Gardner-Holdt viscosity of $Z_2$ as a 70% by weight solution in styrene.

To 75 parts of a 50% by weight solution in styrene of the above polyester resin was added 2 parts of a 55% by weight paste of benzoyl peroxide in n-butyl benzyl phthalate. This mixture was then added with stirring to the above aqueous continuous phase, in which it formed globules of resin solution in which could be seen disperse aqueous particles. A further 100 parts of water was then added to the mixture and polymerisation accelerated by heating the mixture of 90° C. for 2 hours.

The cross-linked vesiculated polymer granules so formed had a diameter of 30 micron maximum, the vasicles being of sub-micron dimensions.

The above experiment was repeated but with the omission of the diethylene triamine. Vesiculated granules of similar dimensions were produced but the vesicles were of 1–5 micron diameter, thus illustrating the importance of the polyamine in producing small vesicles.

When paints were prepared from each sample of granules by the general method of example 7 it was seen that dried films of the paints comprising granules in which the vesicles had sub-micron dimensions were of higher opacity than those made with the more coarsely vesiculated granules.

EXAMPLE 14

Preparation of vesiculated polyester resin granules

An aqueous continuous phase was prepared from:

| | Parts |
|---|---|
| Water | 196.9 |
| Hydroxyethyl cellulose | 0.7 |
| Poly(vinyl alcohol) as example 1 | 2.4 |
| Diethylene triamine | 1.7 | by stirring the above ingredients together for 2 hours.

The hydroxyethyl cellulose was of the grade used in the previous examples and had a viscosity of approximately 20,000 as a 1% by weight solution in water at 25° C.

A polyester resin was prepared in conventional manner from iso-phthalic acid, fumaric acid and propylene glycol in the approximate molar ratios of 1:2:3. The product had an acid value of 37 mgm. KOH per gm. and a Gardner Holdt viscosity of U as a 70% by weight solution in styrene. The resin passed the screening test when tested as a solution in xylene.

A mixture of 75 parts of a 50% solution in styrene of the above resin and 2 parts of a 55% by weight paste of benzoyl peroxide in n-butyl benzyl phthalate was stirred into the above aqueous continuous phase, in which it formed a stable suspension of globules of about 30 micron maximum diameter. A further 100 parts of water were added and the droplets polymerised by heating to 90° for 2 hours.

The vesiculated cross-linked polyester granules so-formed were of about 28 micron maximum diameter.

EXAMPLE 15

Effect of polymerisable monomer composition on granules prepared by the process of the invention The general procedures of example 14 were followed using an unsaturated polyester resin of maleic anhydride, phthalic anhydride and propylene glycol (approx. 1:1:2 molar ratios) with an acid value of 39 mgm. KOH per gm. and a Gardner-Holdt viscosity of W as a 70% by weight solution in styrene. Furthermore, the polymerisable monomer (styrene) of that example was replaced in a series of experiments by the following monomers:

(a) divinyl benzene
(b) "vinyl toluene"/methyl methacrylate (4:1 by weight).
(c) styrene/divinyl benzene (95:5 by weight)
(d) methyl methacrylate
(e) vinyl acetate The monomers a–c all gave satisfactory vesiculated cross-linked polyester granules but when monomers $d$ and $e$ were used the granules were of low vesicle content and with a high content of non-vesiculated granules. It is to be noted that both methyl methacrylate and vinyl acetate are relatively water soluble compared with the other monomers and do not fall within our understanding of essentially water-insoluble polymerisable monomers.

EXAMPLE 16

Preparation of vesiculated polyester granules from a similar but higher viscosity unsaturated polyester resin to that of example 3

An unsaturated polyester resin was prepared by the general method of example 4 but replacing 40% by weight of the propylene glycol of that example with ethylene glycol. The resin had an acid value of 35 mgm. KOH per gm. and a Gardner-Holdt viscosity of $Z_2$ as a 70% by weight solution in styrene. By the general method of example 4 vesiculated cross-linked polyester resin granules were prepared from this resin. The granules were somewhat larger than those of example 4, having a maximum diameter of about 20 micron and comprising vesicles of 1–5 micron diameter.

EXAMPLE 17

Effect of base type on the process of the invention

An aqueous continuous phase was prepared by stirring the following materials together for 2 hours:

| | Parts |
|---|---|
| Water | 720.0 |
| Hydroxy ethyl cellulose | 4.2 |
| Poly(vinyl alcohol) as for example 1 | 6.8 |
| Dimethyl aniline | 3.0 |

A further series of aqueous phases was prepared to the above general formula but substituting the bases shown in the table below for the triethylamine on a chemical equivalent basis.

A polyester resin was prepared in conventional manner from maleic anhydride, phthalic anhydride and propylene glycol in the approximate molar ratios of 1:1:2. The product had an acid value of 38 mgm. KOH per gm. and a Gardner Holdt viscosity of W as a 70% by weight solution in syrene.

A mixture of 30 parts of a 60% by weight solution in styrene of the above resin and 1 part of a 55% by weight paste of benzoyl peroxide in n-butyl benzyl phthalate was then added with stirring to each of the above aqueous phases and polymerisation initiated by heating the mixtures to 90° C. for 2 hours, with the results shown.

| Base | Dissociation exponent | Nature of granules |
|---|---|---|
| Dimethyl aniline | 8.85 | Non-vesiculated. |
| Morpholine | 5.67 | Moderate degree of vesiculation. |
| Ammonia | 4.76 | Well defined vesiculated structure. |

The results show that unsatisfactory results are obtained with bases having a dissociation exponent of greater than 8, while the best results are achieved when the base has a dissociation exponent within the preferred range of less than 5.

EXAMPLE 18

Effect of base concentration on the process of the invention

By the general method of example 17 an attempt was made to prepare vesiculated granules of cross-linked polyester resin from a polyester resin prepared from fumaric acid, phthalic acid and propylene glycol in the approximate molar ratios of 3:1:4. The resin had an acid value of 25 mgm. KOH per gm. and a Gardner-Holdt viscosity of X+ as a 70% by weight solution in styrene. The resin passed the standard screening test as a solution in xylene.

The base used was diethylene triamine and the concentration expressed as equivalents of base per equivalents of carboxyl groups in the resin was as shown for each of the three experiments.

Base level | Result
1:1 | Well vesiculated granules of approx. 30 micron max. dia.
4:1 | Vesiculated granules but slight tendency to form a proportion of very fine particles.
12:1 | Suspension of globules unstable. High proportion of non-vesiculated granules.

The results show that when the concentration limit of base according to the invention was exceeded an unsatisfactory result was produced. When the base level fell within the preferred range, superior results were obtained to the experiment at a 4:1 base level.

EXAMPLE 19

Effect of the viscosity of the unsaturated polyester resin on the process of the invention An unsaturated resin was prepared from fumaric acid, phthalic anhydride and propylene glycol in the approximate molar ratios of 3:1:4. The product had an acid value of 43 and a Gardner-Holdt viscosity of K as a 70% by weight solution in xylene.

A mixture of 15 parts of a 70% by weight solution of the above resin in styrene and 0.5 parts of a 55% by weight paste of benzoyl peroxide in n-butyl phthalate was used to prepare vesiculated polester resin granules by the general method of Example 17, using the following aqueous continuous phase:

| | Parts |
|---|---|
| Water | 84.0 |
| Hydroxy ethyl cellulose | 0.5 |
| Poly(vinyl alcohol) as example 1 | 0.8 |
| Diethylene triamine | 0.3 |

Granules of up to 30 micron diameter were formed but it was observed that a porportion of these were not vesiculated. That is the use of an unsaturated polyester resin of lower viscosity than our preferred limit gave a lower yield than theoretical of vesiculated granules.

EXAMPLE 20

Effect of acid value of the unsaturated polyester resin on the process of the invention The polyester resin of example 19 was condensed further to give a product of Gardner-Holdt viscosity $Z_2$ as a 70% by weight solution in styrene. The acid value of the resin fell to 4 mgm. KOH per gm.

Example 19 was then repeated using the above resin in place of the resin of that example. Crosslinked polyester resin granules of diameters up to 40 micron were produced but the degree of vesiculation was seen to be unusually low by comparison with, for example, the granules according to example 1. A sample of the granules was dried in air to provide gaseous vesicles therein and processed into a paint by the general method of example 7. A dried film of paint comprising these granules when tested according to example 7 showed only a slight increase in opacity over the control paint in which non-vesiculated polymer granules were used.

It can be seen, therefore, that increasing the viscosity of the unsaturated polyester resin of example 19 to lie within our preferred limits did not impart the most favourable vesiculated structure for some purpose to the granules formed therefrom, when it was accompanied by a fall in acid value to below the lower preferred limit.

EXAMPLE 21

Preparation of large vesiculated cross-linked polyester granules

A mixture of:

| | Parts |
|---|---|
| Water | 1000.00 |
| Poly(vinyl alcohol) as example 1 | 30.00 |
| Hydroxy ethyl cellulose | 1.00 | was stirred for 1 hour to form an aqueous continuous phase. The following ingredients were stirred until homogeneous with a high-speed mechanical stirrer:

| | Parts |
|---|---|
| Water | 70.00 |
| Diethylene triamine | 0.57 |
| Titanium dioxide pigment | 32.00 |
| 0.880 ammonia | 0.80 |

An unsaturated polyester resin was prepared in conventional manner from fumaric acid, phthalic anhydride and propylene glycol in the approximate molar ratios of 3:2:1. The resin had an acid value of 22 mgm. KOH per gm. and a Gardner-Holdt viscosity of Z-2 as a 70% by weight solution styrene.

A solution of 72.5 parts of the above resin in 55.5 parts of styrene was prepared and to it added 1 part of a surface-active agent, which was an ethylene oxide co-condensate as used in example 10. To this mixture was added slowly with stirring the above aqueous pigment dispersion, which formed discrete disperse particles therein; and then 3.0 parts of cumene hydroperoxide. The dispersion so-prepared was then added immediately with stirring to the aqueous continuous phase, in which it formed a suspension of globules. The batch was then held at 95° C. for 1.5 hours to polymerise the globules which formed cross-linked vesiculated polyester resin granules of 0.5 mm. maximum diameter.

We claim:

1. A process of preparing vesiculated cross-linked polyester resin granules which consists essentially of the following steps in combination:
   (a) selecting a xylene-soluble unsaturated polyester resin containing free carboxyl groups, which polyester resin is characterized by the fact when said polyester resin is dissolved in xylene to form a solution, and there is stirred into the xylene solution 5% of an aqueous ammonia solution, the ammonia content of which is one molar equivalent based on the acid value of the unsaturated polyester resin in the said xylene solution, there forms spontaneously in said solution a dispersion of aqueous liquid droplets essentially of less than 5 micron diameter which dispersion remains stable for at least 30 minutes,
   (b) suspending by continuous mechanical agitation a solution, in an essentially water-insoluble polymerizable unsaturated monomer, of a said selected unsaturated polyester resin, in the form of discrete droplets consisting essentially of said solution of said polyester resin in said monomer, in an aqueous continuous phase and in the presence of from 0.3 to 10.0 equivalents per carboxyl group of a base which has a dissociation exponent of less than 8 and is selected from inorganic hydroxides and carbonates, ammonia and water-dispersible aliphatic amines, to form an oil-in-water type suspension of resin solution in the aqueous phase, and
   (c) initiating polymerization in the oil-in-water suspension by known means to cross-link the polyester resin.

2. A process according to claim 1 in which the solution of unsaturated polyester resin is pigmented.

3. A process according to Claim 1 in which the base has a dissociation exponent of less than 5.

4. A process according to Claim 1 in which there is present from 0.7 to 3.0 equivalents per carboxyl group of base.

5. A process according to Claim 1 in which the unsaturated polyester resin has an acid value of 10–50 mgm. KOH per gm.

6. A process according to Claim 1 in which the unsaturated polyester resin has a Gardner Holdt viscosity of at least S as a 70% by weight solution in xylene.

7. A process according to Claim 1 in which the unsaturated monomer is selected from the group consisting of styrene, α-methyl styrene, "vinyl toluene" and divinyl benzene.

8. A process as set forth in Claim 1 in which said solution of polyester resin in said monomer also contains a free radical initiator.

References Cited

UNITED STATES PATENTS

| 3,255,127 | 6/1966 | Von Bonin et al. | 260—2.5 B |
| 3,244,772 | 4/1966 | Von Bonin e tal. | 260—2.5 B |
| 3,442,842 | 5/1969 | Von Bonin et al. | 260—2.5 N |
| 3,256,219 | 6/1966 | Will | 260—2.5 N |

MORTON FOELAK, Primary Examiner

U.S. Cl. X.R.

260—2.5 L, 16, 29.6 NR, 29.6 MN, 29.7 N, 29.7 NR, 862